F. V. ELBERTZ.
DIFFERENTIAL MECHANISM.
APPLICATION FILED AUG. 2, 1916.

1,317,279.

Patented Sept. 30, 1919.
2 SHEETS—SHEET 1.

Witnesses
Arthur F. Draper
Chas. W. Stauffiger

Inventor
Frank V. Elbertz
By
Attorneys

F. V. ELBERTZ.
DIFFERENTIAL MECHANISM.
APPLICATION FILED AUG. 2, 1916.
1,317,279.
Patented Sept. 30, 1919.
2 SHEETS—SHEET 2.
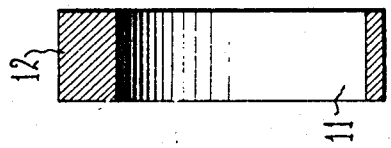
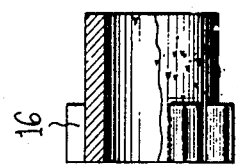
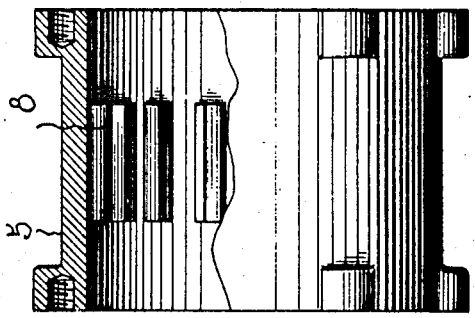
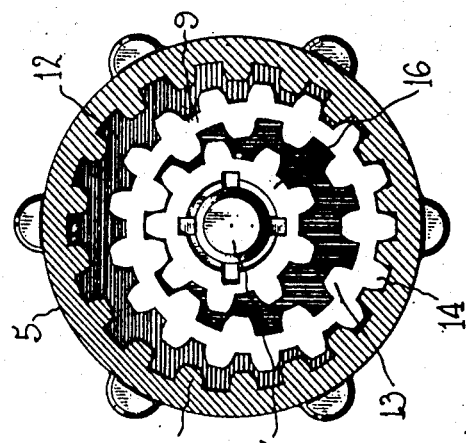
Witnesses
Arthur F. Draper
Chas. W. Stauffiger
Inventor
Frank V. Elbertz
By
Attorneys

UNITED STATES PATENT OFFICE.

FRANK V. ELBERTZ, OF DETROIT, MICHIGAN.

DIFFERENTIAL MECHANISM.

1,317,279.  Specification of Letters Patent.  Patented Sept. 30, 1919.

Application filed August 2, 1916. Serial No. 112,697.

*To all whom it may concern:*

Be it known that I, FRANK V. ELBERTZ, a citizen of the United States of America, residing at Detroit, in the county of Wayne and State of Michigan, have invented certain new and useful Improvements in Differential Mechanism, of which the following is a specification, reference being had therein to the accompanying drawings.

This invention relates to differential gearing and an arrangement thereof whereby the driven mechanism, as for example, the two sections of the follower shaft, are rotated at a speed suitable to the requirements of service but in such relation to the driving parts as never to fall below the initial speed imparted to them.

The invention also includes means whereby the usual planetary gears or beveled type gears are supplanted by other parts of more simple and easily assembled and finished mechanism.

The invention consists in the matters hereinafter set forth, and more particularly pointed out in the appended claims.

In the drawings,

Fig. 2 is a view in section taken on or about line II—II of Fig. 1;

Fig. 3 is a view in detail of an internal gear and teeth;

Fig. 4 is a view in detail of a combination of internal and external annular gears;

Fig. 5 is a view in detail of a follower pinion;

Fig. 6 is a view in detail of an eccentric bushing in which the annular gear is eccentrically mounted.

Figure 1:
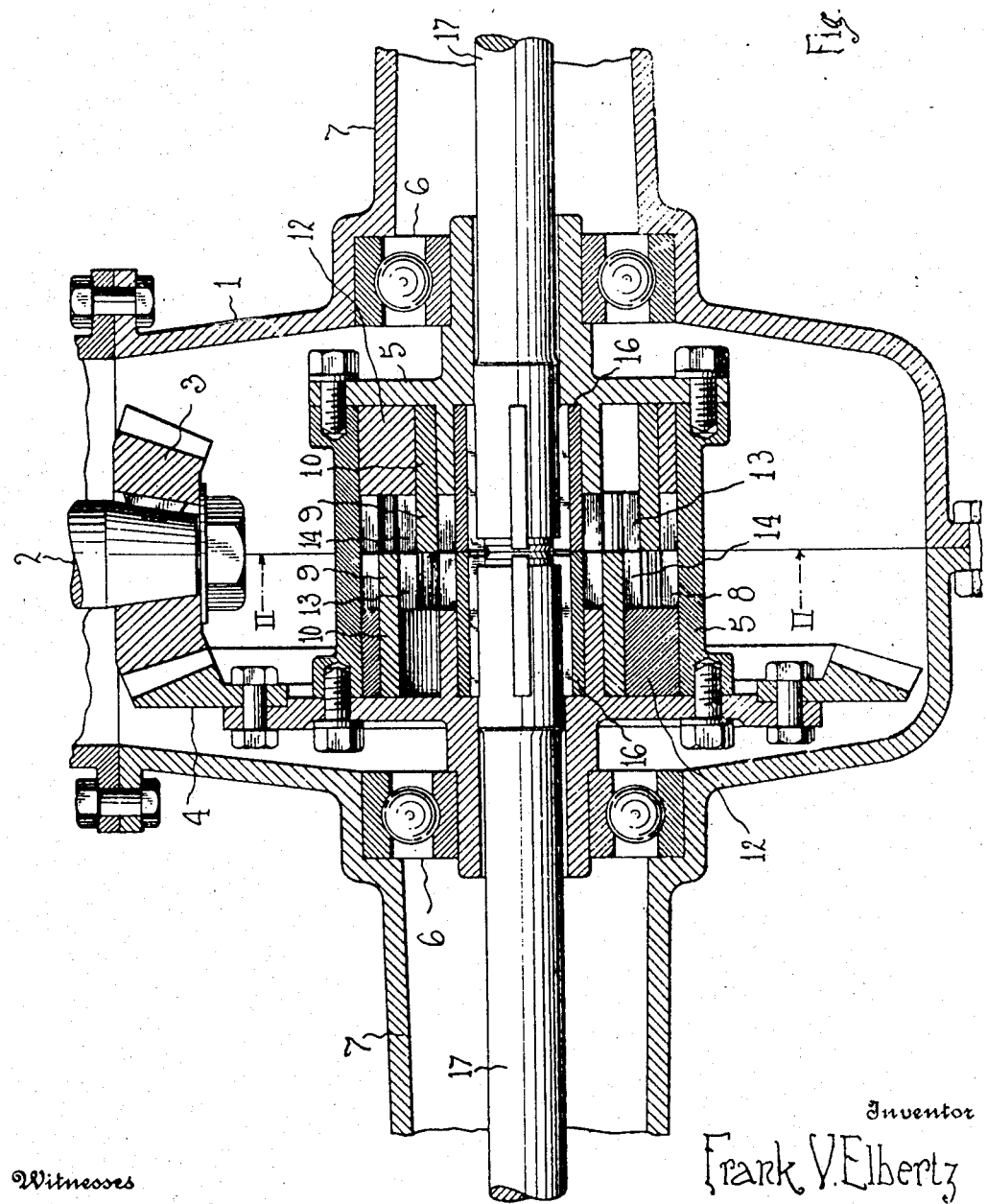
Figure 1 is a view in longitudinal section, partially broken away and partially in elevation, of a device embodying features of the invention.

As herein shown in preferred form, an outer casing 1 of appropriate design houses the inner end portion, if desired, of a drive shaft 2 provided with a drive beveled gear 3 that meshes with an annular beveled pinion 4. A gear casing 5 on which the annular pinion 4 is secured, is rotatably mounted at the outer extremities thereof or in any convenient manner, in appropriate anti-friction bearings 6 that maintain the axis of the casing in substantial concentric alinement with extension arms 7 of the housing or the like. An inner annular gear 8 in the housing 5, that may be formed integrally thereon or secured thereto as the case may be, is in mesh with a pair of follower pinions 9 each of which has an elongated hub 10 that is journaled in an eccentric opening 11 of a bushing 12, the latter being revoluble in the casing 5. Inner gear teeth 13 formed concentrically with the outer gear teeth 14 of the annular pinion, 9, mesh with a companion follower shaft pinion 16 the hub of which is non-rotatably secured to one of the sections 17 of the follower shaft. The latter sections are journaled in the casing 5.

As a result of this construction the two sections 17 rotate under the driving effort of the pinion gear 3 and annular beveled pinion 4 and casing 5 in unison. If under any exigences of service, either one of them tends to be retarted behind the other, it cannot, because of the construction, as plainly illustrated, rotate at less speed than that imparted to it by the beveled pinion 4 and the rotation of the casing 5 and inner gear 8, and in consequence the one which is traveling faster, tends to travel still faster because of this attempted retardation of the other section, and is forced to move the annular compound or internal-external gear around sufficiently to compensate for this. As a result of this motion of the annular gear, the unretarded portion of the shaft is speeded up to move at higher than driving speed while the other portion maintains driving speed. In automobiles this eliminates skidding to a large extent and greatly increases the ability of the machine to pull out of ruts and the like.

Obviously, changes in the details of construction may be made without departing from the spirit of my invention and I do not care to limit myself to any particular form or arrangement of parts.

What I claim is:—

1. A differential gearing comprising a drive shaft, a gear casing rotatable transversely thereto, means for driving the casing from the shaft, a follower shaft the two sections of which are journaled concentrically in the gear casing, an inner annular gear in the casing, pinions each secured to the sections of the follower shaft, bushings rotatably mounted concentrically with the pinions in the gear casing, and compound pinions mounted eccentrically in the bushings in mesh respectively with the inner annular gear and the shaft section pinion.

2. Differential gearing comprising an outer casing, a gear casing journaled therein, a drive shaft transverse to the axis of the gear casing, means for operatively connecting the shaft to the gear casing to drive the latter, a follower shaft having sections journaled concentrically with the gear casing, pinions each secured to the end of a section, an internal annular gear secured in the casing concentric with the shaft pinions, bushings journaled in the casing concentric with the shaft sections, pinions journaled in the bushings eccentrically with the shaft sections, outer gear teeth on the pinions meshing with the inner annular gear of the casing and inner gear teeth on the pinions meshing with the shaft section pinions.

3. Differential gearing including a rotatable gear casing, means for driving the casing, an internal annular gear secured in the casing, follower shaft sections journaled in the casing concentric with the axis thereof, pinions secured on the end portions of the follower shaft sections concentric with the internal annular gear, means for operatively coupling the internal annular gear and the shaft pinions, and means confining the orbit of revolution of the coupling means to an axis eccentric to the axis of rotation of the shaft sections.

In testimony whereof I affix my signature in presence of two witnesses.

FRANK V. ELBERTZ.

Witnesses:
 ANNA M. DORR,
 CHAS. W. STAUFFIGER.